US010548341B2

(12) United States Patent
Barber et al.

(10) Patent No.: US 10,548,341 B2
(45) Date of Patent: Feb. 4, 2020

(54) POTATO CHIP

(71) Applicant: FRITO-LAY NORTH AMERICA, INC., Plano, TX (US)

(72) Inventors: Keith Alan Barber, Frisco, TX (US); Justin French, Frisco, TX (US); Girish Ganjyal, Plano, TX (US); Christopher James Koh, Southlake, TX (US); Scott L. Sullivan, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 818 days.

(21) Appl. No.: 13/904,889

(22) Filed: May 29, 2013

(65) Prior Publication Data

US 2013/0266720 A1 Oct. 10, 2013

Related U.S. Application Data

(63) Continuation-in-part of application No. 13/308,285, filed on Nov. 30, 2011, now Pat. No. 8,945,648.

(51) Int. Cl.

| | |
|---|---|
| ***A47J 37/12*** | (2006.01) |
| ***A23L 5/10*** | (2016.01) |
| ***A23B 7/157*** | (2006.01) |
| ***A23L 19/18*** | (2016.01) |

(52) U.S. Cl.

CPC ................ *A23L 5/11* (2016.08); *A23B 7/157* (2013.01); *A23L 5/12* (2016.08); *A23L 19/18* (2016.08); *A47J 37/1214* (2013.01)

(58) Field of Classification Search

CPC ..... A01B 12/006; A23L 1/217; A23L 1/0107; A23L 1/0114; A47J 37/1214; A23B 7/157

See application file for complete search history.

(56) References Cited

U.S. PATENT DOCUMENTS

| | | | |
|---|---|---|---|
| 2,177,166 | A | 5/1938 | Bemis |
| 3,635,149 | A | 1/1972 | Smith |
| 3,733,202 | A | 5/1973 | Marmor |
| 3,966,983 | A | 6/1976 | Dexter |
| 4,189,994 | A | 2/1980 | Schmader |
| 4,325,295 | A | 4/1982 | Caridis |
| 4,503,127 | A | 3/1985 | Fan |
| 4,537,786 | A | 8/1985 | Bernard |
| 4,563,944 | A | 1/1986 | Tate |

(Continued)

FOREIGN PATENT DOCUMENTS

| | | |
|---|---|---|
| EP | 0026565 B1 | 4/1981 |
| WO | WO 97/40712 A1 | 11/1997 |

(Continued)

OTHER PUBLICATIONS

International Search Report and Written Opinion of the International Searching Authority from International Application No. PCT/US2014/035275 dated Aug. 28, 2014 (7 pages).

(Continued)

*Primary Examiner* — Steven N Leff

(74) *Attorney, Agent, or Firm* — James R. Gourley; Colin P. Cahoon; Carstens & Cahoon, LLP

(57) ABSTRACT

A potato chip that has more oil near its outer surfaces than in its interior and a unique RVA profile is disclosed. The organoleptic properties of the inventive potato chips compare favorably to known and commercially available potato chips.

8 Claims, 3 Drawing Sheets

10000
9000
8000
7000
6000
5000
4000
3000
2000
1000
0
3 33 62 91 121 150 179 209 238 267 297 326 355 385 414 443 473 502 531 561 590 619 649 678 707 737 766 795 825 854 883 913 942 971 1001 1030 1059 1089 1118
410
412
404
402
416
414

(56) References Cited

U.S. PATENT DOCUMENTS

| | | | | |
|---|---|---|---|---|
| 4,741,912 | A | 5/1988 | Katz | |
| 4,844,930 | A | 7/1989 | Mottur | |
| 4,882,984 | A | 11/1989 | Eves | |
| 4,923,705 | A | 5/1990 | Mottur | |
| 4,929,461 | A | 5/1990 | Schonauer | |
| 4,933,199 | A | 6/1990 | Neel | |
| 4,956,189 | A | 9/1990 | Johnson | |
| 4,980,187 | A | 12/1990 | Johnson | |
| 5,643,626 | A * | 7/1997 | Henson et al. | 426/438 |
| 5,846,589 | A | 12/1998 | Baker | |
| 6,067,899 | A | 5/2000 | Caridis | |
| 6,129,939 | A | 10/2000 | Fink et al. | |
| 6,251,465 | B1 | 6/2001 | Bello | |
| 6,558,724 | B1 | 5/2003 | Caridis | |
| 6,703,065 | B2 * | 3/2004 | Villagran et al. | 426/637 |
| 7,074,446 | B2 * | 7/2006 | Heywood et al. | 426/292 |
| 7,303,777 | B2 | 12/2007 | Baas | |
| 8,318,229 | B2 | 11/2012 | Desai | |
| 8,371,568 | B2 | 2/2013 | Hermann | |
| 2002/0028273 | A1 * | 3/2002 | Teras | A21B 5/08 426/439 |
| 2006/0083831 | A1 | 4/2006 | Caridis | |
| 2006/0088633 | A1 | 4/2006 | Barber | |
| 2008/0138480 | A1 | 6/2008 | Bows | |
| 2009/0297671 | A1 | 12/2009 | Basker | |
| 2009/0304878 | A1 | 12/2009 | Loehn | |
| 2010/0021602 | A1 | 1/2010 | Caridis | |
| 2010/0051419 | A1 | 3/2010 | Desai | |
| 2011/0281005 | A1 | 11/2011 | Desai | |
| 2012/0052169 | A1 | 3/2012 | Janakat | |
| 2012/0103764 | A1 | 5/2012 | Price | |
| 2013/0022719 | A1 | 1/2013 | Barber | |

FOREIGN PATENT DOCUMENTS

| | | | |
|---|---|---|---|
| WO | 2006/019689 | A2 | 2/2006 |
| WO | WO 2012/104217 | A2 | 8/2012 |

OTHER PUBLICATIONS

International Search Report and Written Opinion of the International Searching Authority from International Application PCT/US2014/034527 dated Oct. 27, 2014 (13 pages).

International Search Report and Written Opinion of the International Searching Authority from International Application No. PCT/2014/021992 dated Jun. 20, 2014 (8 pages).

* cited by examiner 18
54
42
40
54
56
62
16
58
50
14B
14A
10
60

10000
9000
8000
7000
6000
5000
4000
3000
2000
1000
0
3
33
62
91
121
150
179
209
238
267
297
326
355
385
414
443
473
502
531
561
590
619
649
678
707
737
766
795
825
854
883
913
942
971
1001
1030
1059
1089
1118
404
402
410
412
416
414

POTATO CHIP

CROSS REFERENCE TO RELATED APPLICATION

This application is a continuation-in-part of co-pending U.S. patent application Ser. No. 13/308,285, entitled "Fried Food Product with Reduced Oil Content," filed Nov. 30, 2011, the technical disclosure of which is hereby incorporated by reference in its entirety.

BACKGROUND OF THE INVENTION

1. Technical Field

The present invention relates to an improved method and system for the production of a fried potato chip.

2. Description of Related Art

Conventional potato chip products are prepared by the basic steps of slicing peeled, raw potatoes, water washing the slices to remove surface starch and frying the potato slices in hot oil until a moisture content of about 1% to 2% by weight is achieved. The fried slices are then salted or seasoned and packaged.

Raw potato slices normally have moisture contents from 75% to 85% by weight depending on the type of potato and the environmental growing conditions. When potato slices are fried in hot oil, the moisture present boils. This results in burst cell walls and the formation of holes and voids which allow for oil absorption into the potato slices yielding significant oil contents.

The oil content of potato chips is important for many reasons. Most important is its contribution to the overall organoleptic desirability of potato chips. Too high an oil content may render the chips greasy or oily and hence less desirable to consumers. On the other hand, it is possible to make chips so low in oil that they lack flavor and seem harsh in texture. Some nutritional guidelines also indicate it is desirable to maintain a diet low in oil or fat.

Numerous attempts have been made in the prior art to control the oil content in potato chips. However, past attempts are either expensive, use technology that requires longer than desirable deoiling dwell time, or have failed to maintain the desired organoleptical properties such as taste and texture that have become familiar to consumers of traditional potato chips.

Consequently, a need exists for a process that allows a practitioner to control the oil content of a fried potato chip and produce a novel final product that retains desirable organoleptical properties similar to traditional potato chips.

SUMMARY OF THE INVENTION

The proposed invention provides a method and system for producing fried potato chips. In one embodiment, washed potato slices are par-fried by immersion in hot oil at a first temperature, and then finish fried by contact with hot oil at a higher second temperature. In a preferred embodiment, the finish frying step is accomplished by a second immersion frying step.

The fried potato chips produced according to the present invention can contain less oil than conventionally fried potato chips, yet retain the desirable visual, taste, and textural qualities of the traditionally fried potato chips.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The present invention is directed to a method and system for producing fried potato chips. The inventive potato chips may, in one embodiment, comprise an oil content that is lower than known and commercially available potato chips. In general, when potato slices are fried in hot oil, moisture leaves the food product as steam, and the slices absorb some of the oil they are fried in. The embodiments described below are directed towards fried potato slices that comprise a specific range of thicknesses, and that have been washed prior to frying. Such fried potato slices are referred to in the art as "potato chips" and can be differentiated from thicker, unwashed potato slices that have been fried, which are referred to in the art as "kettle chips" or kettle-fried chips. The invention is designed in one embodiment to reduce, but not eliminate, the overall oil content of the finished potato slice.

Figure 1:
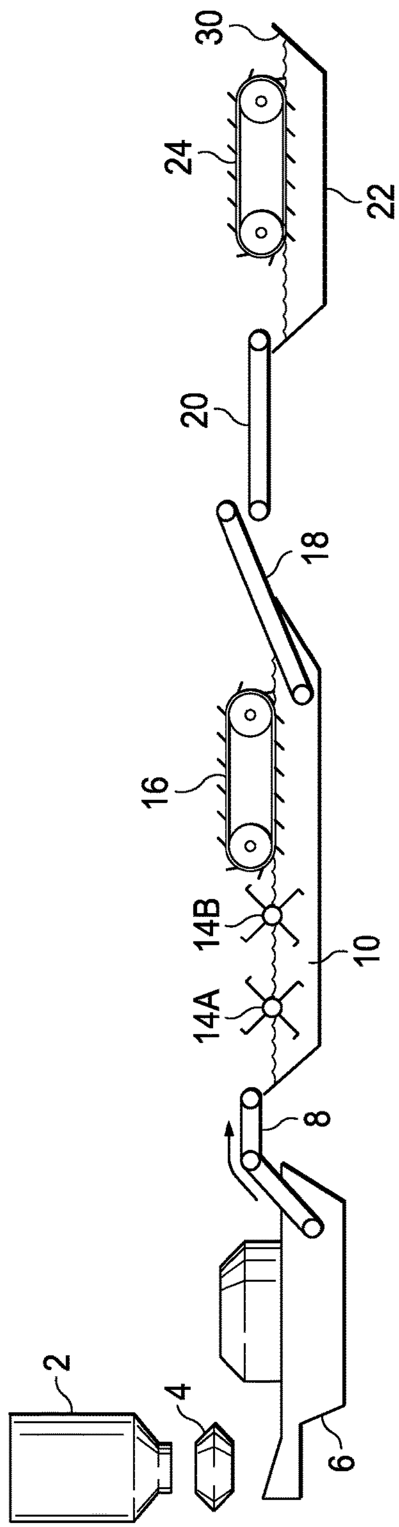
FIG. 1 is a schematic representation of one embodiment of the method and system used to produce the potato chip of the present invention.

FIG. 1 depicts a preferred system that can be used to produce the potato chips of the present invention. Whole potatoes stored in hopper 2 are dispensed into a slicing apparatus 4 which drops potato slices into a water wash 6. In order to produce potato chips, the potatoes are sliced to produce potato slices that comprise a thickness between 0.040 inches and 0.080 inches, with a target of 0.053 inches. In a preferred embodiment, the range of slice thicknesses for potato chips is from 0.040 inches to 0.063 inches. Potato slices with thicknesses that fall above this range are used in the art to produce "kettle chips" and other thicker potato products, which are not called "potato chips" by a skilled artisan.

In a preferred embodiment, the frying oil entering the fryer is maintained at an initial temperature between about 320° F. to about 380° F. more preferably between about 335°

F. and about 370° F. Any conventional frying medium can be used in accordance with various embodiments of the present invention, including frying mediums with digestible and/or non-digestible oils. In one embodiment, the fryer is a continuous single flow or multizone fryer which utilizes devices such as paddle wheels, 14A and 14B, and a submergible conveyor belt 16 to control the flow of potato slices (not shown) through the fryer 10.

In one embodiment of the present invention, the potato slices are par-fried to an intermediate moisture content and then removed from the fryer, preferably by a perforated endless belt conveyor 18 (sometimes referred to as a takeout conveyor). If no hot oil is added to the frying oil or if the oil is not otherwise heated during frying, at the location the perforated endless belt conveyor 18 contacts the frying oil, the frying oil comprises a final par-fly temperature of between about 290° F. to about 330° F. and more preferably between about 300° F. to about 320° F. The final par-fly oil temperature, as that term is used herein, of the first immersion frying step is the oil temperature at the location of the takeout means. For a continuous frying process, the takeout means will typically comprise a takeout conveyor 18, as depicted in FIG. 1, and for a batch process the takeout means will typically be a perforated basket or takeout conveyor. In either case, the final par-fly oil temperature is the temperature of the oil at the location of the potato slices as they are being removed from the oil by the takeout means.

In one embodiment, the potato slices exit the fryer comprising an oil content of between about 30% and about 45% by weight, and an intermediate moisture content above 2% by weight, or in another embodiment above 3% by weight. In one embodiment, the intermediate moisture content is between about 1.5% and about 15% by weight, or in another embodiment, between about 3% and about 10% by weight, or combinations of the foregoing ranges. In a preferred embodiment, the par-fried potato slices comprise an intermediate moisture content between about 2% and 10% by weight, and most preferably between about 3% and 6% by weight. Preferably, the final moisture content of the potato slices is less than about 10%, and more preferably less than about 5%, by weight of the potato slices below the intermediate moisture content of the potato slices.

As shown in FIG. 1, the par-fried slices are then subjected to a hot oil finish frying step, which in a preferred embodiment, is accomplished by transferring them to a second immersion frying tank 22. The transfer between the first immersion frying step and second immersion frying step can occur by use of takeout conveyor 18 and, optionally, transfer conveyor 20. In a most preferred embodiment, transfer conveyor 20 runs at a higher speed than takeout conveyor 18, thereby reducing the thickness of the potato chip bed, or substantially monolayering the potato chips on the transfer conveyor. Second immersion tank 22 may comprise a submerger belt 24, and the finished potato chips can flow over front lip 30, or be removed by another takeout conveyor (not shown).

Figure 2:
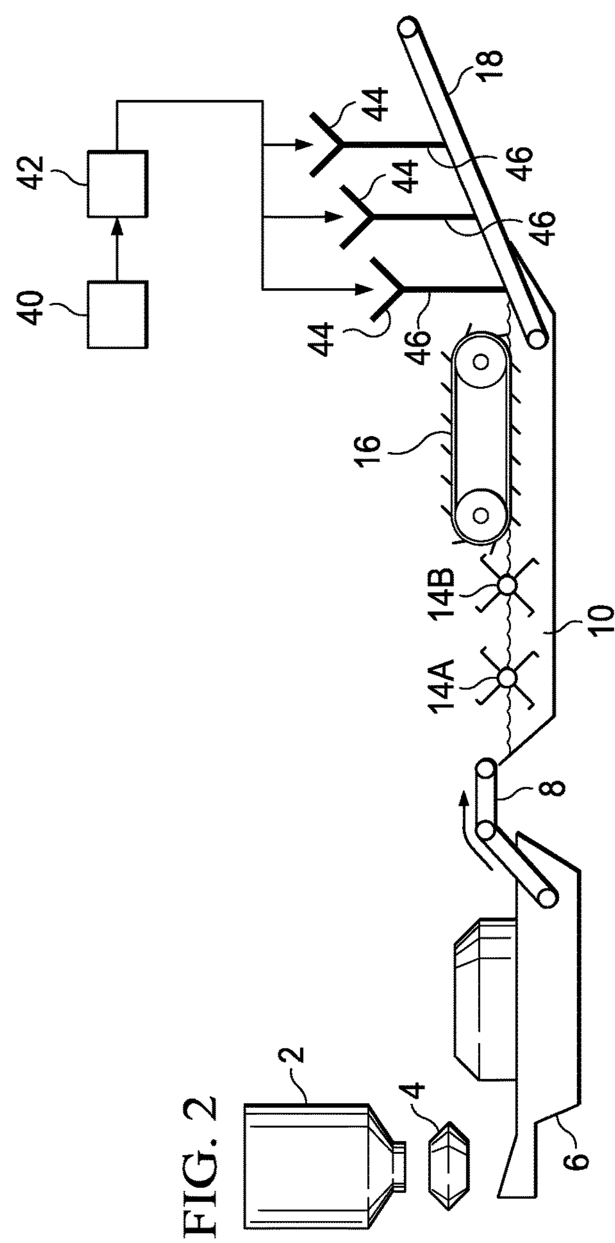
FIG. 2 is a schematic representation of another embodiment of the method and system used to produce the potato chip of the present invention.

FIG. 2 depicts another embodiment of a hot oil finish frying method and system comprising at least one hot oil curtain disposed above the takeout conveyor. A hot oil curtain 46 is a volume of oil flowing from an oil dispenser 44 above the takeout conveyor 18, through the potato slices on the takeout conveyor and the takeout conveyor. Preferably, the hot oil curtain 46 spans substantially the entire width of the takeout conveyor. Oil from the hot oil curtain 46 can be collected underneath the takeout conveyor in its own receptacle separate from the hot oil used for immersion frying, or can drain into the hot oil used for immersion frying. The oil used for the hot oil curtain is fed from an oil source 40, optionally through a heat exchanger 42, and into the oil dispensers 44 above the takeout conveyor 18. In one embodiment, the oil source 40 is a source of fresh or reconditioned oil, and in another embodiment, the oil source 40 is the same oil used in the immersion fryer 10. In one embodiment, the temperature of the hot oil curtain is greater than the final par-fly oil temperature of the first immersion frying step.

Figure 3:
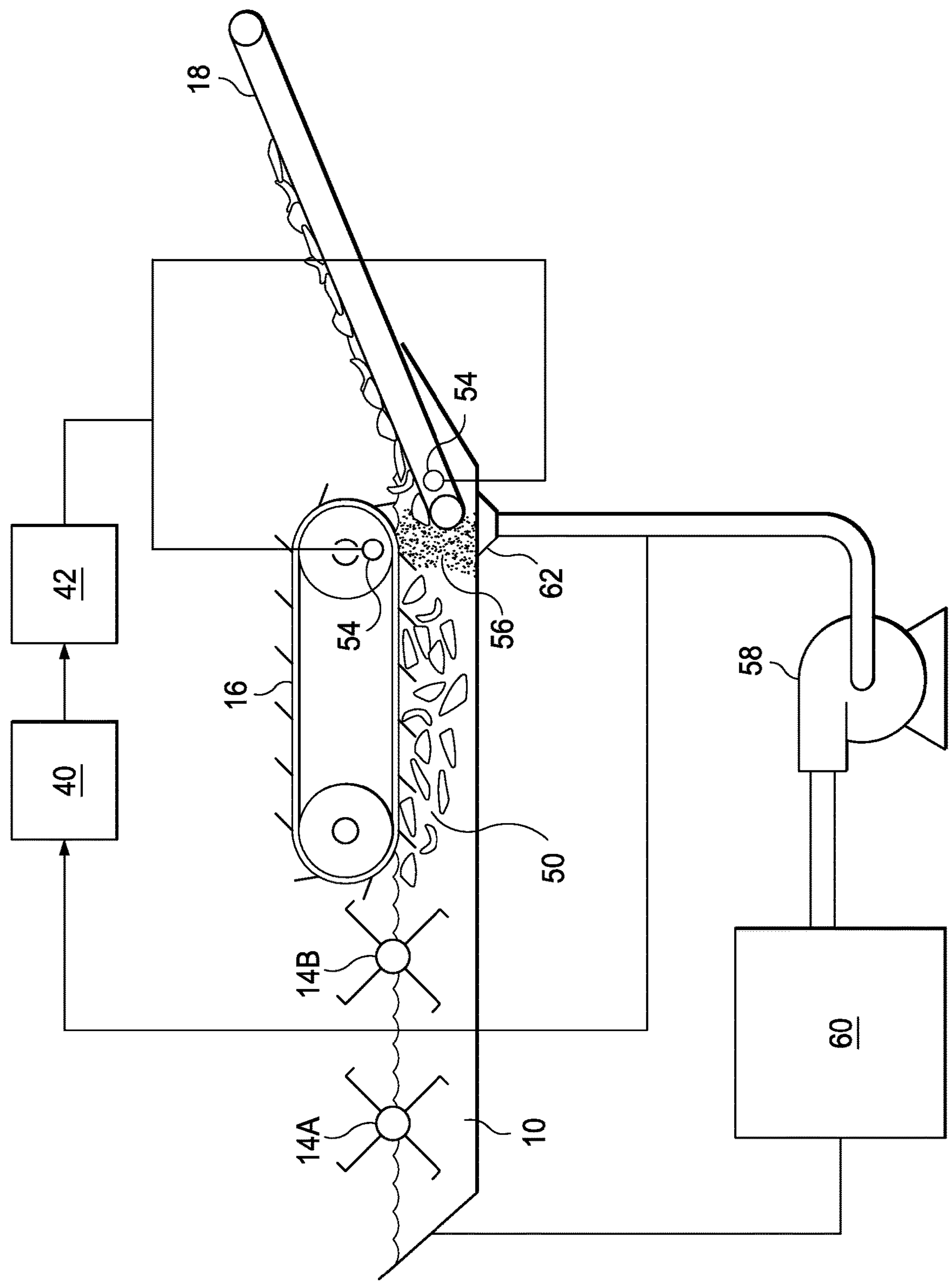
FIG. 3 is a schematic representation of another embodiment of the method and system used to produce the potato chip of the present invention.

In still another embodiment, depicted in FIG. 3, the products being fried by immersion in hot oil can be subjected to a hot oil finish frying step by providing a submerged hot oil curtain inside the frying oil 10. One example of a submerged hot oil curtain is depicted by the shaded region 56 of FIG. 3. In the embodiment depicted in FIG. 3, the submerged hot oil curtain 56 is provided by at least one hot oil dispenser 54 located above the product bed 50 as it passes under the submerger 16. In a preferred embodiment, the submerged hot oil curtain 56 is supplemented by at least one oil dispenser 54 located below the product bed 50 as it moves from the submerger 16 to the takeout conveyor 18. The oil dispensers 54 can be fed by a fresh oil source 40 which is heated by a heat exchanger 42, but may also be fed, in whole or in part, by oil recycled from the fryer.

Because only a short hot oil finish fry time is required to realize the advantages of the present invention, the submerged hot oil curtain can represent a narrow band or region of oil between the submerger 16 and takeout conveyor 18. The hot oil is restricted to the regions inside the fryer near the oil dispensers 54 because the recirculation system drain 62 is located near the product exit end of the fryer. The recirculation system uses at least one pump 58 and heat exchanger 60 to recycle the oil to the product entrance end of the fryer. This maintains a well-defined region of hot oil in close proximity to the submerger 16 and takeout conveyor 18 that constitutes the submerged hot oil curtain 56.

Applicants have determined that the vapor pressure of water inside a potato slice varies at different product temperatures and moisture contents. It was found that in order to maintain the vapor pressure inside the potato chip above 14.7 psia (or approximately atmospheric pressure), the product temperature must be above about 270° F. to 310° F. at moisture contents ranging from 1% to 2% moisture content. Therefore, Applicants theorize that the product temperature must be at least this high in order for water vapor inside the potato chip to resist the absorption of oil via capillary action. In fact, the product temperature must likely be even higher than these temperatures to overcome gravitational and capillary forces that may also favor absorption of oil, and will certainly need to be higher if water vapor is used to expel oil from the void spaces within the potato chip. Moreover, the oil temperature must be higher than the desired product temperature to account for the commercially needed high rates of heat transfer between the oil and the product. In fact, Applicants have discovered that when an oil temperature of 340° F. is used in the finish frying step, no oil is removed or absorbed in the final product as compared to products that are fried to their final moisture content in one frying step. By contrast, a finish frying oil temperature of 290° F. causes more oil to be absorbed by the final product, and a finish frying oil temperature of 390° F. causes less oil to be absorbed in the final product.

In one embodiment, the temperature of the oil in the second immersion frying step is at least about 350° F., and in a preferred embodiment at least about 385° F. In a preferred embodiment, the temperature of the oil in the second immersion frying step is greater than 340° F. and less than 415° F. In another embodiment, the difference between the final par-fly oil temperature in the first frying step and the initial finish-fry oil temperature in the finish frying step is at least 30° F. In a preferred embodiment, the difference is at least 50° F.

In one embodiment, the potato slices are subjected to a first frying step by immersion in oil at a first temperature, followed by a second frying step by immersion frying in hot oil at a second temperature, which is greater than the first temperature. A known process for continuous immersion frying of potato slices uses an initial oil temperature of 350° F. to 360° F., a final oil temperature of about 250° F. to 320° F., and a residence time of about 190 seconds. If hot oil is not added to the system, the oil cools as the food pieces are fried. The potato slices exit this frying process at a moisture content of about 1.4% by weight. In one embodiment of the inventive process described herein, potato slices are immersion fried at about the same initial oil temperature and on the same continuous frying equipment, but the residence time is reduced to about 80 seconds to 180 seconds, or in a preferred embodiment the residence time is reduced to about 80 seconds to 130 seconds. Then, as described above, the slices are removed from the hot oil, preferably as a product bed on a takeout conveyor, and subjected to finish frying by transferring the slices to a second immersion frying step.

In a preferred embodiment, the second immersion frying step is a short time, high temperature immersion frying step. In this embodiment, the takeout conveyor from the first step can feed the par-fried potato slices into a second volume of oil maintained at a higher temperature than the oil temperature used for the first immersion frying step. More than one conveyor, or a different transfer means, may be used between the frying steps. For par-fried potato slices, preferably the residence time in the second immersion fryer is less than about 10 seconds, and more preferably less than about 5 seconds, to bring the moisture content of the potato slices to a final moisture content of less than 2% by weight. The finish fried potato slices can be removed from the second volume of oil by any convenient means, such as a second takeout conveyor, a perforated basket, or flowing over a weir at the end of the fryer.

Applicants have discovered that the inventive process has several surprising advantages over known frying methods.

First, the fried food products that are produced by the invention can comprise a lower oil content than food products subjected to known immersion frying processes. Generally, the method described herein can be used to control oil content so that the final oil content is similar to conventionally fried potato slices, or in another embodiment, lower than conventionally fried potato slices. In one embodiment, potato slices produced by the inventive method comprise an oil content of about 30%, whereas potato slices produced using only a conventional immersion frying step would comprise an oil content of about 35%. This result was surprising because the inventive fried food products also have flavor, color and texture characteristics similar to fried food products produced by known frying methods. Even though the invention is not limited by theory, Applicants believe that the hot oil finish frying step controls oil content in several ways.

The viscosity of frying oil generally decreases with increasing temperature. Applicants believe that the hotter oil used in the finish frying step of the present invention drains more efficiently from the slices on the takeout conveyor.

The hot oil also likely causes a rapid increase in chip temperature which converts most of the water remaining inside the potato slices into steam, which exits the slices. Applicants believe that this rapid conversion to steam also ejects a portion of the oil that had been absorbed into the slice during immersion frying. In fact, when Applicants have analyzed the location of oil inside and on the surface of potato chips fried according to conventional methods, and compared it with those fried according to the inventive method described herein, Applicants have found a striking difference in the location of oil that is believed to confer advantages over prior art potato chips. Applicants tested a range of potato chips, from samples that are commercially available and samples fried under process laboratory conditions according to previously known methods, to samples made according to the inventive method described herein. The inventive potato chips have been found to comprise more oil near the outer surfaces as compared to the interior of the chip, than known prior art slices.

To perform the oil location analysis, Applicants performed a CT (computed tomography) scan on the known and inventive samples of potato chips. Each sample was prepared for CT scan by first selecting a source for the sample. Commercially available samples included potato chips sold under the trademarks Lay's Classic, Walkers, Walkers Light, Reduced Fat Ruffles, and Lay's Light. The commercially available reduced fat potato chips analyzed here were made by conventionally frying potato slices and mechanically stripping oil from the chips (typically by passing high velocity air or steam over them) after they were removed from the hot oil frying step. Inventive potato chips included samples fried at varying conditions to produce total oil content by weight that ranged from approximately equal to Lay's Classic to approximately equal to the commercially available reduced fat potato chips described above.

From each sample, a relatively flat potato chip was chosen, and that chip was broken into an approximately square piece that was about 2 centimeters on a side. The 2 cm square piece was then glued to a specimen holder and placed into the CT scanner, and the resulting image color coded for density. The CT scanner was a Sky-scan 1172 computed tomography x-ray scanner, and the Sky-scan 1172 software was used to develop the raw images. The scanner settings were as follows: medium camera pixels—2K; pixel size—5-7 μm; rotation separation—0.3 degrees; averaging—7 frames; random movement—5. The raw images were also reconstructed using NRecon software. Image analysis was performed using CTAn and CTVol software, and Microsoft Excel. When the images are color coded for density, the oil and potato starch appear as distinct colors, and the CT scanner software can determine the total volume and percent volume of each component. The data for each slice was divided into volumetric thirds, with each volumetric third consisting of (2 cm)×(2 cm)×(⅓ slice thickness). In other words, each outer third comprised one of the two 4-square-centimeter outer surfaces of the sample piece, and the inner third did not include either 4-square-centimeter outer surface of the sample piece. The data was then analyzed by computer algorithm to determine how much oil was contained in each third of the slice. For each sample, more oil was found in the outer thirds than the inner third. However, the inventive potato slices comprised surprisingly more oil in the outer thirds than the inner third.

The oil distribution between the interior and exterior of a potato slice can be quantified by subtracting the oil content in the middle third from the average of the oil contents in the outer thirds, dividing that by the average of the oil contents of the outer thirds. As used herein, the term Surface Oil Difference for a potato chip shall be defined as ((average of oil contents of outer thirds) minus (oil content of inner third)) divided by (average of oil contents of outer thirds). All oil contents used in the Surface Oil Difference calculation are measured as a percentage of total oil volume, as determined using the CT scanning procedure and method described above. In other words, one inventive sample comprised 40.5% of the total oil volume in one outer third, 46% of the total oil volume in the other outer third, and 13.5% of the total oil volume in the interior third. For all samples tested, the Surface Oil Difference ranged from about 0.15 to about 0.7. The low oil varieties sold under the trademarks Walkers Light, Reduced Fat Ruffles, and Lay's Light exhibited a Surface Oil Difference of 0.15 to 0.25. Lay's Classic had a Surface Oil Difference of 0.45. Four separate samples of the inventive potato chips described herein exhibited a Surface Oil Difference above 0.5, ranging from 0.52 to 0.69. Therefore, in one embodiment, the inventive potato chip herein comprises a Surface Oil Difference of 0.5 or greater, or in another embodiment a Surface Oil Difference between 0.5 and 0.7.

Applicants also theorized that because the potato slices that become the inventive potato chips have undergone a different thermal history than prior art or known potato slices, the potato starch of the final product may also exhibit different characteristics than that of known potato chips. In fact, Applicants have found that the potato starch of the inventive chips does exhibit a unique RVA (rapid visco analyzer) curve as compared to known or commercially available potato chips. To analyze this starch property, Applicants prepared the potato chip samples for RVA analysis as follows: the potato chip samples were chopped into fine particles, and the residual frying oil was extracted from each sample using a Buchi Soxhlet Extraction Unit B-811. Defatting the potato chip samples focuses the analysis on the potato starch by substantially eliminating any influence on RVA results due to different oil content between samples.

Next, three grams of defatted potato chip sample and 25 grams of water are mixed in an RVA container, and immediately inserted into the RVA machine. The starting temperature for the RVA analysis was 30° C. The RVA paddle spins at 960 rpm for the first 10 seconds of the analysis, then 160 rpm for the remainder. The temperature remains at 30° C. for the first three minutes of the analysis, then is raised 95° C. over the next seven minutes, remains at 95° C. for the next four minutes, drops to 50° C. over the following four minutes, and remains at 50° C. for the final minute of the test. The total time for the analysis is 19 minutes. The sample preparation and RVA analysis protocol described above will be referred to herein as the "RVA Protocol" and for claims directed to potato chips having certain RVA characteristics, such RVA characteristics are intended to be measured using the RVA protocol.

Figure 4:
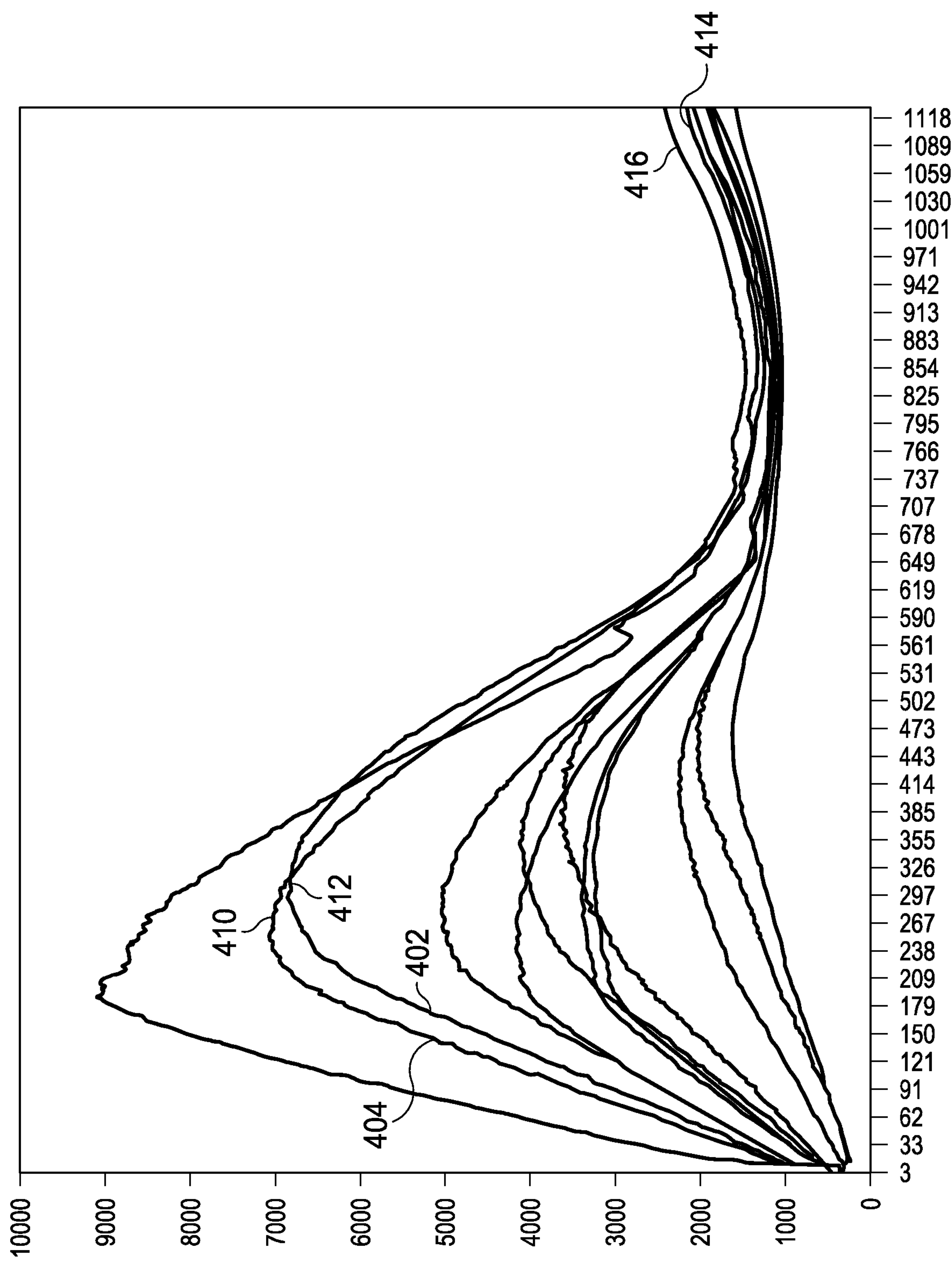
FIG. 4 is a graph showing the RVA profiles for various potato chip samples.

The resulting RVA curves are depicted in FIG. 4. Each inventive potato chip curve 402 and 404, comprises a first peak 412 and 410, and a second peak 416 and 414, respectively. When the quantity (peak 2/peak 1) is plotted on the y-axis versus (peak 1) on the x-axis, the inventive potato chips occupy a region of the graph that is uninhabited by data points for the other samples tested. In particular, for all of the inventive samples analyzed by Applicants, the (peak 2/peak 1) value of the RVA curve is between 0.25 and 0.45, and peak 1 value of the RVA curve is between 6000 and 8100. The data points for all other tested samples fell outside these ranges. Therefore, in one embodiment, the potato chips of the present invention comprise a first RVA peak and a second RVA peak, wherein (second RVA peak/first RVA peak) is between 0.25 and 0.45, and wherein said first RVA peak is between 6000 and 8100.

The oil location and RVA differences between the known and inventive slices are particularly surprising in light of the results of an analysis performed by a trained sensory panel on known and inventive potato chips. A panel of sensory analysts specifically trained to define and describe differences between a reference potato chip and test potato chips was asked to evaluate several different potato chip samples in comparison to the reference, including inventive potato chips comprising 35% oil, 33% oil, and 28% oil, along with two commercially available Lay's potato chip samples at 35% and 38% oil, two commercially available low oil potato chips produced by mechanical stripping of oil post-frying, and two conventional potato chip samples at 35% and 36% oil made according to known frying methods in a process lab. The sensory panel rated the inventive samples at 33% and 35% oil as slightly different and very slightly different, respectively, from the reference sample. The 28% oil inventive potato chip sample was rated as definitely different, but less different than either of the commercially available low oil samples. However, the main driver of the difference in the 28% oil sample was an off-flavor in the oil. The texture ratings given for all inventive samples compared favorably to the reference sample. The fact that slightly lower oil inventive samples were perceived as very slightly different or slightly different may be explained by the presence of more oil at the surface of those chips, as compared to the oil found near the middle of the chips. Oil near the surface is available to be immediately perceived when the chips are eaten. Even the very low oil inventive potato chip would likely have been perceived as slightly or very slightly different from reference if the oil flavor itself had not been described as off.

Applicants have observed that when typical potato slices are fried using previous immersion frying methods, after a residence time in the oil of between about 80 seconds and 130 seconds, the bubbling of potato slices inside the fryer slows substantially—a point referred to as the bubble end point. The bubble end point will vary according to potato slice characteristics and oil temperature, but regardless of conditions the bubble end point is visually perceptible by a skilled artisan. Applicants believe that at this point, the remaining water inside the potato slices has stopped converting to steam as efficiently as before, and oil starts absorbing into the potato slices after the bubble end point. As described herein, in one embodiment Applicants propose to remove the potato slices from the first frying step before or shortly after the bubble end point, and subject them to a short time/higher temperature finish frying step to remove the remaining water and reduce the oil content of the final product. In one embodiment, the potato slices are removed from the first frying step within about 10 seconds of (before or after) the bubble end point. In another embodiment, the potato slices are removed from the first frying step less than about 50 seconds after the bubble end point, and in a preferred embodiment less than about 30 seconds after the bubble end point. Applicants have found that when the potato slices are then transferred to a hotter oil finish frying step, the potato slices bubble rapidly as the water remaining in the slices is converted to steam. Also, because the food pieces are kept hot during the second frying step, water vapor present inside the potato chip will remain in the vapor state for a longer period of time and resist oil uptake that is believe to occur during cooling.

Second, the equipment used to carry out the inventive method can be easily retrofitted onto existing frying equipment. Equipment that can be retrofitted reduces the capital costs of implementing the inventive method. Perhaps more importantly, the inventive method can dramatically increase the capacity and throughput of existing frying equipment. As stated above, the immersion frying time for potato chips can be reduced from about 190 seconds to between 80 and 130 seconds (preferably, between about 100-120 seconds). Such a reduced frying time could allow an existing fryer that has the capacity to produce 6,000 pounds of fried food pieces per hour, when modified according to the present invention, to produce up to 10,000 pounds per hour of fried food pieces. Because the food products spend less time in the frying oil, and because the fryer has increased throughput, the quality of the oil will be consistently higher because of the lower duty cycle and potentially higher fresh oil replenishment rate. Finally, the inventive potato chips that are produced at higher capacity show similar texture and flavor characteristics to reference and commercially available potato chips, but when examined analytically show different oil locations and RVA curves for the potato starch.

It will now be evident to those skilled in the art that there has been described herein a method and system that can be used to produce potato chips that have controlled oil content but retain the desirable characteristics of conventionally fried food pieces. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

What is claimed is:

1. A potato chip comprising:

a potato slice comprising a thickness between 0.040 inches and 0.080 inches which has been washed and fried to a moisture content below about 2% by weight to produce said potato chip, wherein said potato chip comprises a Surface Oil Difference of 0.5 or greater.

2. The potato chip of claim 1 wherein said thickness is between 0.040 inches and 0.063 inches.

3. The potato chip of claim 1 wherein said Surface Oil Difference is between 0.5 and 0.7.

4. The potato chip of claim 1 wherein said potato chip additionally comprises a first RVA peak and a second RVA peak, wherein (second RVA peak/first RVA peak) is between 0.25 and 0.45, and wherein said first RVA peak is between 6000 and 8100.

5. A potato chip comprising:

a potato slice comprising a thickness between 0.040 inches and 0.080 inches which has been washed and fried to a moisture content below about 2% by weight to produce said potato chip, wherein said potato chip comprises a first RVA peak and a second RVA peak, wherein (second RVA peak/first RVA peak) is between 0.25 and 0.45, and wherein said first RVA peak is between 6000 and 8100.

6. The potato chip of claim 5 wherein said thickness is between 0.040 inches and 0.063 inches.

7. The potato chip of claim 5 wherein said potato chip additionally comprises a Surface Oil Difference of 0.5 or greater.

8. The potato chip of claim 7 wherein said Surface Oil Difference is between 0.5 and 0.7.

* * * * *